United States Patent
Le et al.

(10) Patent No.: US 11,748,333 B2
(45) Date of Patent: Sep. 5, 2023

(54) VERIFYING DATA CONSISTENCY USING VERIFIERS IN A CONTENT MANAGEMENT SYSTEM FOR A DISTRIBUTED KEY-VALUE DATABASE

(71) Applicant: Dropbox, Inc., San Francisco, CA (US)

(72) Inventors: Preslav Le, Belmont, CA (US); Braden Walker, San Francisco, CA (US); Leslie Tu, San Francisco, CA (US); Tanay Lathia, San Francisco, CA (US); Alexander Sosa, San Francisco, CA (US); Lihao He, San Mateo, CA (US)

(73) Assignee: DROPBOX, INC., San Francisco, CA (US)

( * ) Notice: Subject to any disclaimer, the term of this patent is extended or adjusted under 35 U.S.C. 154(b) by 167 days.

(21) Appl. No.: 17/364,606

(22) Filed: Jun. 30, 2021

(65) Prior Publication Data
US 2023/0004550 A1    Jan. 5, 2023

(51) Int. Cl.
*G06F 16/23* (2019.01)
*G06F 16/22* (2019.01)

(52) U.S. Cl.
CPC ...... *G06F 16/2365* (2019.01); *G06F 16/2272* (2019.01)

(58) Field of Classification Search
CPC .......... G06F 16/2272; G06F 16/2365
See application file for complete search history.

(56) References Cited

U.S. PATENT DOCUMENTS

| | | | |
|---|---|---|---|
| 10,684,966 B1* | 6/2020 | Hamman | G06F 13/1668 |
| 2012/0209822 A1* | 8/2012 | Prabhakar | G06F 16/2365 707/703 |
| 2013/0067180 A1* | 3/2013 | Leet | G06F 16/113 711/161 |
| 2016/0342641 A1* | 11/2016 | Wang | G06F 16/235 |
| 2018/0246945 A1* | 8/2018 | Lee | G06F 11/3476 |
| 2019/0263312 A1 | 8/2019 | Ma et al. | |
| 2020/0089791 A1 | 3/2020 | Raman et al. | |
| 2021/0049716 A1 | 2/2021 | Li | |

* cited by examiner

*Primary Examiner* — Grace Park
(74) *Attorney, Agent, or Firm* — Fenwick & West LLP

(57) ABSTRACT

A consistency verification system that verifies data consistency in a content item management system. The system maintains a plurality of verifiers for checking data consistency, each verifier comprising instructions for verifying consistency for a type of requests. The system may verify the original request by selecting a verifier from the plurality of verifiers based on a type of the original request. Using the selected verifier, the consistency verification system may send verification requests to the content item management system at a second timestamp that is a period of time after the original timestamp. The system may determine whether the second response is consistent with the first response. If the responses are not consistent, the system may output information describing data inconsistency. If the responses are consistent, the system may output results and perform further verifications to help ensure data accuracy.

17 Claims, 12 Drawing Sheets

Local Slice Datastore
510

Local slice table 610

| Slice ID | Range | Current State | Next State | Last registry timestamp |
|---|---|---|---|---|
| Slice 1-1 | [a, i) | Owned | Null | 2 |
| Slice 1-2 | [q, z] | Transfer-in-handoff | Owned | 14 |

Local slice table 620

| Slice ID | Range | Current State | Next State | Last registry timestamp |
|---|---|---|---|---|
| Slice 2-3 | [i, q) | Owned | Transfer-out-readonly | 3 |
| Slice 2-4 | [i, m) | Transfer-in | Null | 8 |
| Slice 2-5 | [m, q) | Transfer-in | Null | 9 |
| Slice 2-6 | [q, z] | Transfer-out-handoff | Unowned | 13 |

*FIG. 6*

Slice Registry Datastore 520

Slice registry table 710

| Slice ID | Range | State | Timestamp | Last timestamp |
|---|---|---|---|---|
| Slice 1-2 | [a, i] | Owned | 2 | 1 |
| Slice 1-3 | [q, z] | Owned | 16 | 14 |
| Slice 2-3 | [i, q] | Owned | 7 | 3 |
| Slice 2-4 | [i, m] | Transfer in | 8 | 5 |
| Slice 2-5 | [m, q] | Transfer in | 9 | 6 |
| Slice 2-6 | [q, z] | Transfer out handoff | 15 | 13 |

*FIG. 7*

Slice Registry Datastore
520

Slice registry log 720

| Timestamp | Slice ID | State |
|---|---|---|
| 1 | Slice 1-2 | Provisioning |
| 1 | Slice 2-3 | Provisioning |
| 1 | Slice 2-6 | Provisioning |
| 2 | Slice 1-2 | Owned |
| 3 | Slice 2-3 | Owned |
| 4 | Slice 2-6 | Owned |
| 5 | Slice 2-4 | Ready |
| 6 | Slice 2-5 | Ready |
| 8 | Slice 2-4 | Transfer in |
| 9 | Slice 2-5 | Transfer in |
| 10 | Slice 1-3 | Ready |
| 12 | Slice 1-3 | Transfer in |
| 13 | Slice 2-6 | Transfer out read only |
| 14 | Slice 1-3 | Transfer in handoff |
| 15 | Slice 2-6 | Transfer out handoff |
| 16 | Slice 1-3 | Owned |

*FIG. 8*

VERIFYING DATA CONSISTENCY USING VERIFIERS IN A CONTENT MANAGEMENT SYSTEM FOR A DISTRIBUTED KEY-VALUE DATABASE

TECHNICAL FIELD

The disclosed embodiments generally relate to database technologies, and particularly to verifiers that check data consistency in a content management system for a distributed key-value database.

BACKGROUND

Distributed database system often involves managing large-scale distributed data tables and supporting concurrent access to a database. The distributed database system may maintain data tables distributed across multiple clusters and may process various types of requests such as read or write requests from multiple clients concurrently. Therefore, the distributed database system may face a challenge to ensure data consistency and accuracy with multiple clients accessing and modifying data simultaneously in the database system. For example, the database should perform consistently such that multiple requests with the same parameters should yield consistent results from the database system. As such, it is helpful to maintain a verification system that can effectively verify whether the database system is reliable and performs consistently without causing data corruptions.

SUMMARY

Systems and methods are disclosed herein for a consistency verification system that verifies data consistency in a content management system. The consistency verification system may maintain a plurality of verifiers for checking data consistency in the content management system, where each verifier comprises a set of instructions for verifying consistency for a type of requests. The content management system may receive requests for accessing or processing data in the database and the consistency verification system may sample one or more requests from the requests received by the content management system. A sampled request may be referred to as an original request that was processed at a first timestamp T1. The original request may be associated with a set of parameters and a first response received at the first timestamp T1. The consistency verification system may verify the original request by selecting a verifier from the plurality of verifiers based on a type of the original request. Using the selected verifier, the consistency verification system may send one or more verification requests to the content management system at a second timestamp T2 that is after the first timestamp T1. The consistency verification system may determine whether the second response matches the first response. Based on a determination that the second response does not match the first response, the consistency verification system may output information describing data inconsistency to the content management system. Based on a determination that the second response matches the first response, the consistency verification system may output results to the content management system and may further perform further verifications to help ensure data consistency and accuracy.

The systems and methods disclosed herein provide various technical advantages. Because the content management system manages simultaneous execution of requests from multiple clients and manages data tables distributed across multiple clusters, it is challenging for the content management system to ensure that the requests don't interfere with each other and that data accuracy and consistency is maintained in the database. The systems and methods disclosed herein provide a verification system that effectively checks data consistency and accuracy by replaying previously processed requests. The verification system verifies results by sampling a plurality of requests and replay the sampled requests with the same parameters but with one or more hold off periods. The replayed requests may be referred to as verification requests. Depending on whether the verification requests yield the same results as the original requests, the verification system may output results to the content management system. Furthermore, the system and methods disclosed herein increase reliability and reduce the chance that errors occur during operations on slices by including various invariant checks, where the invariants are certain properties that the database needs to hold to ensure safe slice operations. Therefore, the content management system addresses the challenges faced by a large-scale distributed database through the systems and methods disclosed herein.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 shows exemplary data structures for local slice datastore, according to one example embodiment.

FIG. 7-8 illustrate exemplary data structures for slice registry datastore, according to one example embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
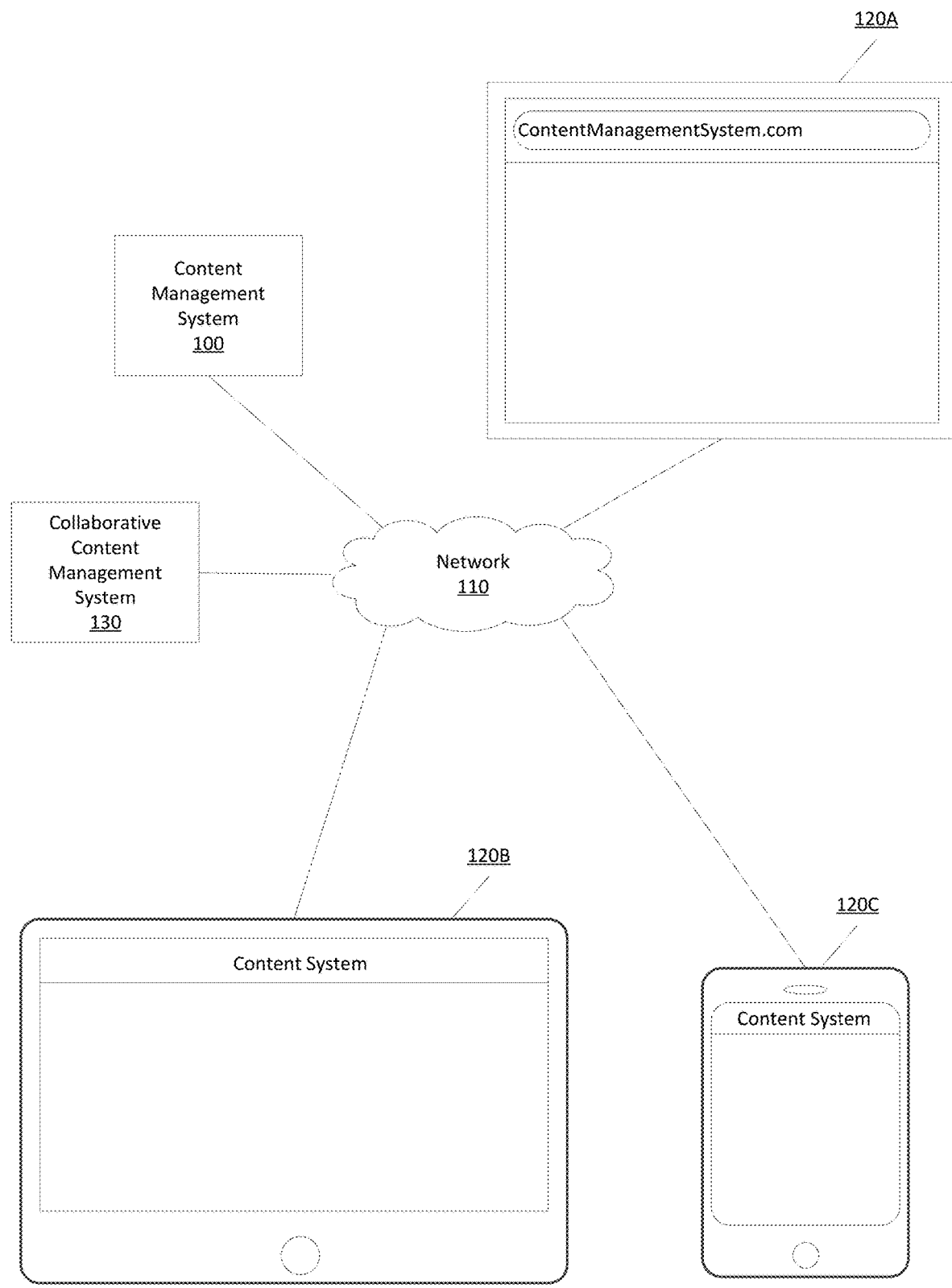
FIG. 1 shows a diagram of a system environment of a content management system and a collaborative content management system according to one example embodiment.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
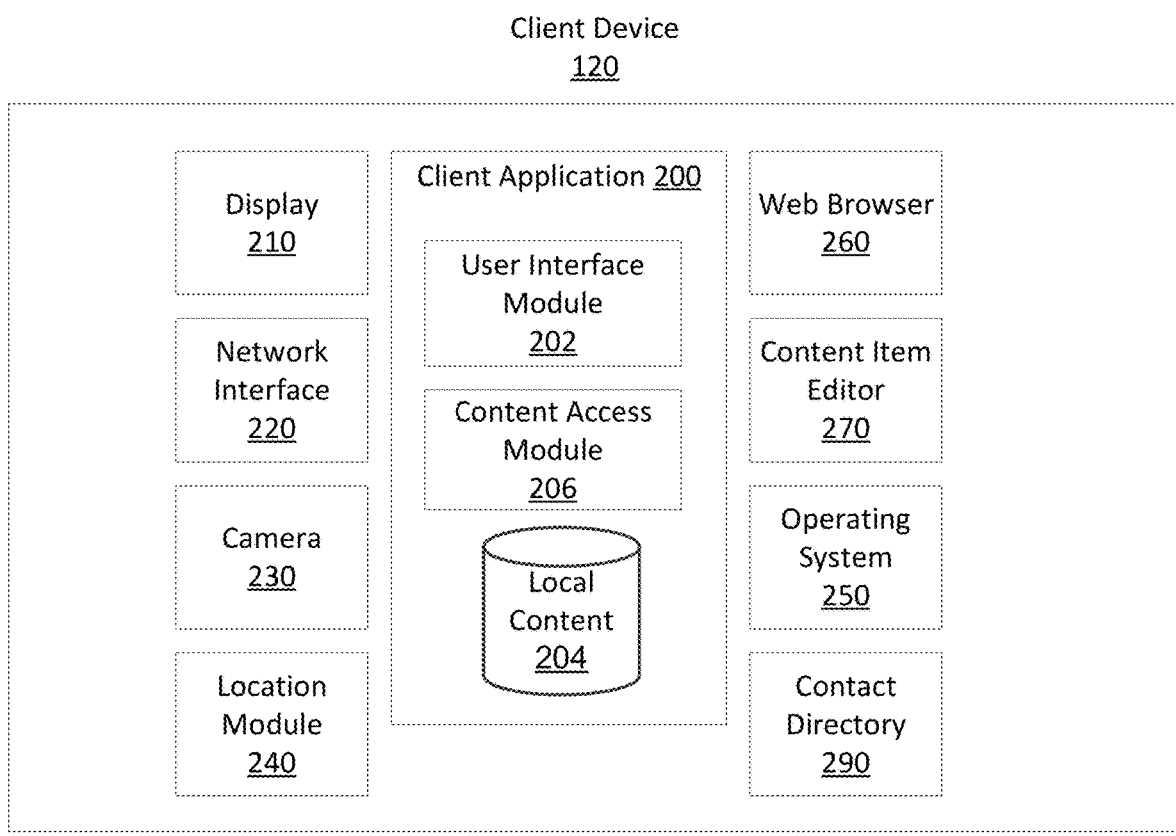
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
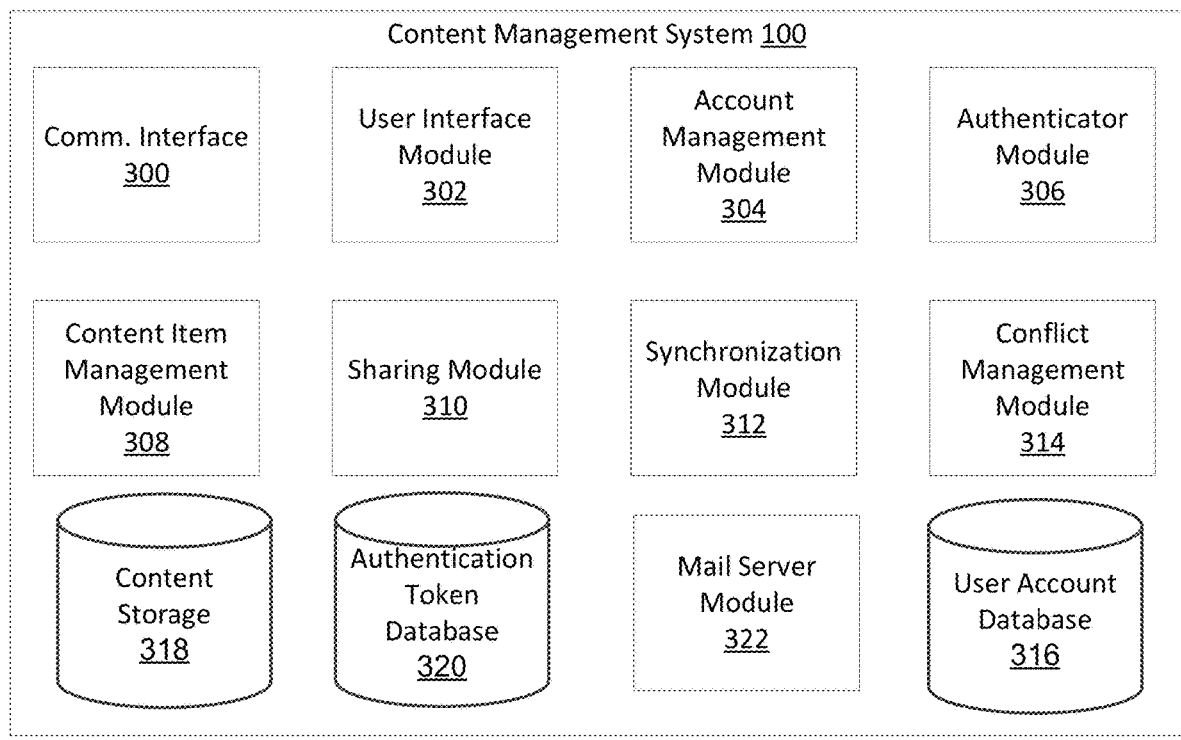
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a username. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. The cloud storage provider or network storage may be owned and managed by the content management system 100 or by a third party. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

In one embodiment, content storage 318 may be a distributed system that stores data as key-value pairs in tables distributed across multiple nodes, where a node may be a system or a device (such as a computer or a server) that stores a portion of the data. In one embodiment, a data table (or table) is a collection of key-value pairs (may also be referred to as entries) that are stored in one node or distributed across multiple nodes. A set of related tables may be grouped as a family of tables.

In one embodiment, the keys are tuples and are used to partition data tables into slices. A slice is a portion of a family of tables including a contiguous key range across one or more tables. For example, a node may contain a first slice and a second slice, with the first slice covering key range [a, d) (i.e. a through d, not including d) from family 1, table 1, and the second slice covering key range [c, e] (i.e. c through e) from family 2, table 1. Each slice is associated with a set of metadata (e.g. slice ID, timestamp, state, etc.) which is stored and managed by content item management module 308, which is discussed in greater detail below in accordance with FIG. 5.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content storage 318 may further decrease the amount of storage space required by deleting content items based on expiration time of the content items. An expiration time for a content item may indicate that the content item is no longer needed after the expiration time and may therefore be deleted. Content storage 318 may periodically scan through the content items and compare expiration time with current time. If the expiration time of a content item is earlier than the current time, content storage 318 may delete the content item from content storage 318.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content item management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Content item management module 308 may process various types of requests such as read and write requests. A read request may specify input parameters such as a timestamp and a key. Responsive to receiving the read request, content item management module 308 may return a response including data for the respective key and the data is retrieved from the database snapshotted at the specified timestamp. A write request may specify parameters such as a timestamp and a key. The write request may further specify other parameters such as pre-conditions for the write request. The write request may not be executed if the one or more preconditions are not met at the time when the write request is to be processed. For example, a write request may specify that a write operation should be processed only if a precondition is achieved. A precondition may be a state that the database should meet at a timestamp (which may be referred to as a precondition timestamp) that is before the request timestamp. For example, a write request may request to perform a write operation to the database at timestamp T1 if a precondition is met such that the precondition requires that, at time T0, the database is in a particular state. As a more specific example, a precondition may specify that a request to the database with key K1 at timestamp T0 should return response R1, and if the precondition is met, a write request may be issued. In one embodiment, a write request specifies a set of preconditions. Responsive to receiving the write request, content item management module 308 may evaluate the preconditions by verifying whether the preconditions hold for the latest data (e.g. data associated with the latest timestamp) stored in the database. If the preconditions hold, a timestamp may be generated for the write request and respective write operations may be performed. In one embodiment, a precondition may be any constraints regarding parameters or behaviors associated with the database.

In one embodiment, content item management module 308 manages slices stored in content storage 318 and stores metadata associated with the slices. In one configuration, content item management module 308 stores metadata such as a slice identifier (ID), a key range that identifies the keys covered by the slice, state information that implies read or write permissions that the slice is able to serve, and timestamp information that indicates the order in time when a state transition of the slice took place. The state information may also indicate whether a slice is claimed or unclaimed. If a slice is claimed, the slice has the most up-to-date data for the key range that the slice covers (which may be also referred to as the slice has claim for the key range), and if a slice is unclaimed, the slice may not have the most updated data, which may also be referred to as the slice does not have claim for the key range.

In one embodiment, content item management module 318 may rebalance data stored across multiple nodes by performing various operations such as transferring slices from one node to another node, merging slices, and splitting a slice into multiple slices. Content item management module 308 may rebalance data among nodes if content item management module 308 determines that data distribution across nodes is uneven (e.g. a node stores significantly more data compared to other nodes or a slice grows in size faster than other slices). In such situations, content item management module 308 may, for example, decide to transfer the data in a slice from the current node to another node that stores less data. Each operation (e.g. transferring, merging or splitting) may be accomplished by performing multiple actions, and each action may cause changes in states for one or more slices. For example, if content item management module 308 transfers data from a first slice to a second slice, during the transfer process, the two slices may each move through a series of states according to their respective state machines. Further detail regarding state transitions for slices during a slice transfer is discussed in accordance with state management module 532 in FIG. 5 and also discussed in accordance with the example illustrated in FIG. 9.

Content item management module 308 may also store a centralized slice registry log that contains a tracked history of timestamped states for slices globally (i.e. for slices on a collection of nodes as opposed to slices on a single node). For example, during a slice transfer operation, each state transition may be associated with a timestamp that indicates when the transition took place. For each complete state transition, content item management module 308 may assign the slice a global timestamp such as a real time stamp (e.g. date and time) or a representation of real time (e.g. 1, 2, 3) to the slice according to the time and order when the state transition took place. Assigning global timestamps to slices across a collection of nodes may provide a serial view of the time and order in which each state transition took place globally. Maintaining historical timestamps and state transitions for each slice may provide consistent snapshot views for each slice given a certain point in time. If multiple requests from different nodes are received to read a slice for a certain timestamp, the requests always get the same results because of the centralized slice registry log.

Content item management module 308 may also include a consistency verification system that verifies data consistency and accuracy with a plurality of verifiers. The consistency verification system may sample a plurality of requests from requests sent to the content item management module 308 and verify the sampled requests by replaying the requests with the same request parameters but with various holdoff periods. Consistency verification system may also include an invariant checking module that performs various invariants checks on metadata such as checking state information and timestamps to ensure that a state transition is valid. Consistency verification system may output verification results to content item management module 308, and content item management module 308 may reject any state transition that is determined to be invalid and allow state transitions that are determined to be valid. Consistency verification system is discussed in further detail in accordance with FIGS. 10-12.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
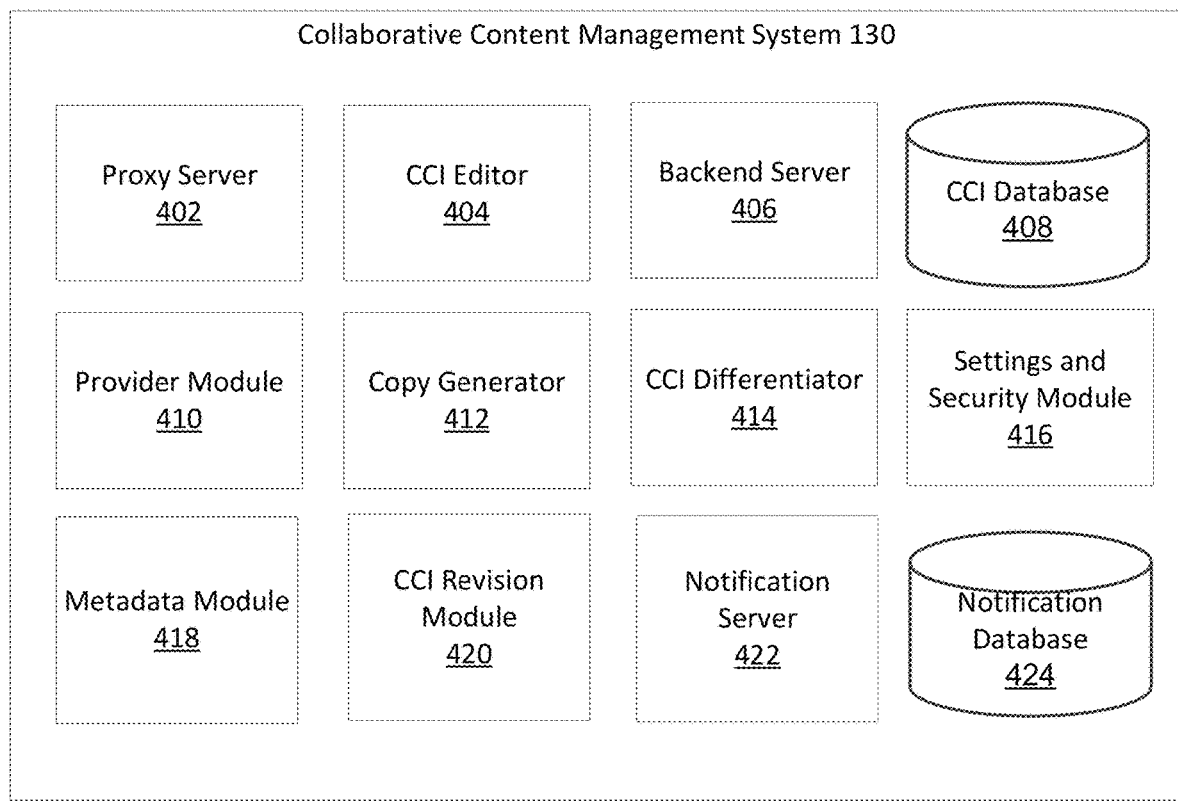
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system and cannot be performed in the human mind simply by mental steps.

Content Item Management Module

Figure 5:
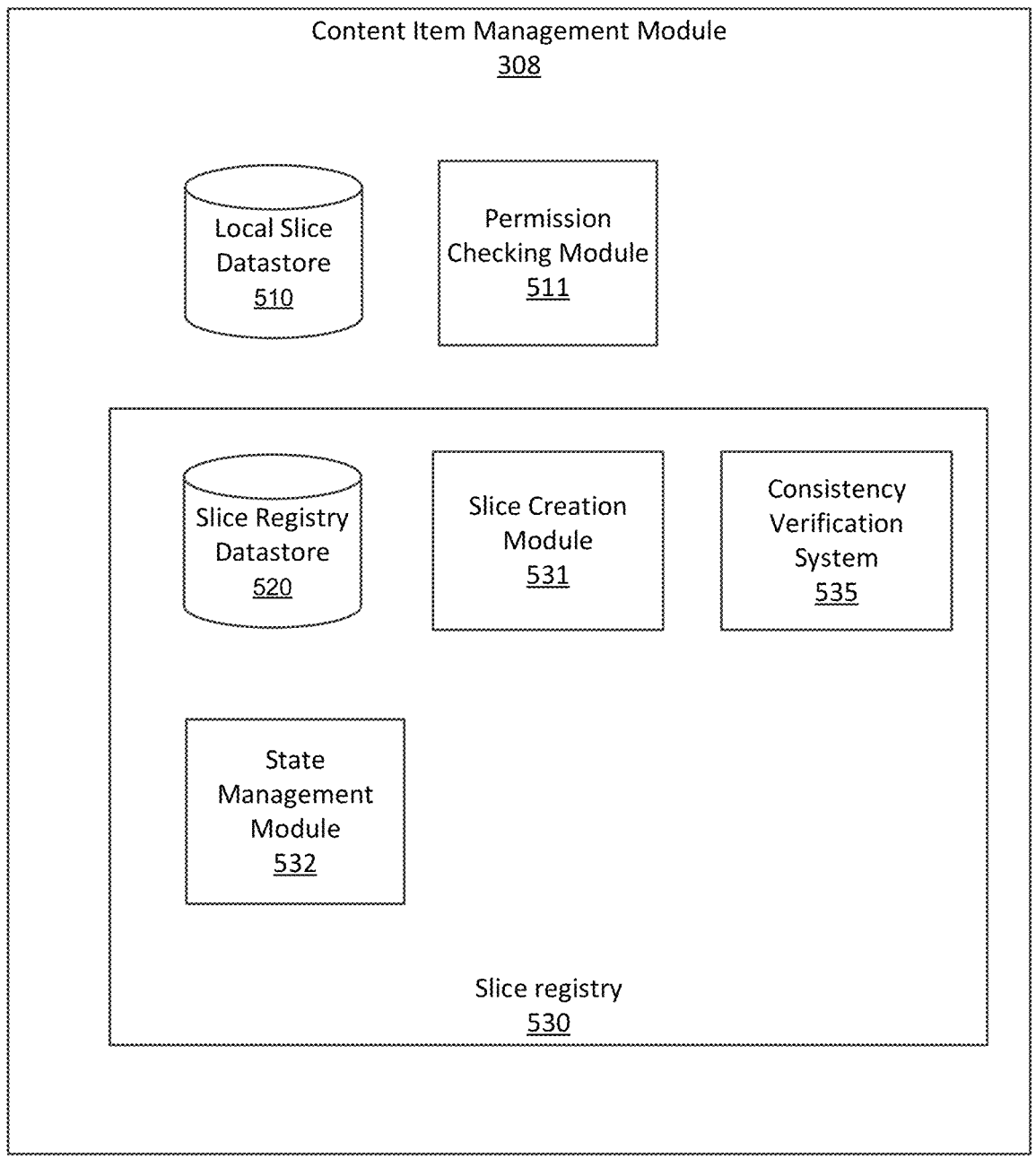
FIG. 5 shows a block diagram of modules in a content item management system, the content item management system including a consistency verification system, according to one example embodiment.

FIG. 5 illustrates an exemplary embodiment of content item management module 308. The content item management module 308 includes a local slice datastore 510 that stores slice metadata locally on each node and a permission checking module 511 that determines the read and/or write permission to serve. The content item management module 308 further includes a slice registry 530 with a slice registry datastore 520 that stores a centralized slice registry table and slice registry log, a new slice creation module 531 that creates new slices, a state management module 532 that manages state transitions and state information of slices, and a consistency verification system 535 that performs verifications and ensures data consistency. The modules shown in FIG. 5 are non-limiting and are for illustrative purposes only; more or fewer modules may be used to achieve the functionality described herein.

Local slice datastore 510 is a data structure that stores metadata associated with slices on a node. In one embodiment, the local slice datastore 510 may reside on each node and record metadata of the slices on the node. Local slice datastore 510 may further store timestamp information associated with slices on the node. Local slice datastore 510 and exemplary metadata are discussed in further detail below in FIG. 6.

FIG. 6 illustrates exemplary particulars of local slice datastore 510 in further detail. FIG. 6 includes an example local slice table 610 for a first node and an example local slice table 620 for a second node. In one embodiment, the information associated with each slice may be referred to as an entry, a record, or a row of a table. Each local slice table 610 and 620 stores metadata associated with slices on respective nodes. For example, as illustrated in FIG. 6, local slice table 610 stores metadata associated with slices located on node 1, i.e. slice 1-1 and slice 1-2, with the name "slice 1-1" suggesting a first slice on node 1 and the name "slice 1-2" suggesting a second slice on node 1 (the names are for illustration purpose). Similarly, local slice table 620 stores metadata for slices 3 through 6 for node 2. Each local slice table contains one or more fields which are discussed in further detail below.

In one embodiment, the fields for local slice datastore 510 are as follows:

Slice ID: As used herein, the term Slice Identifier (ID) may refer to a unique identifier assigned by the content item management module 308 to identify a particular slice. The slice ID may contain information such as the node that slice is located on and a unique slice identifier within the node (e.g. slice 1-2 suggests a slice 2 on node 1).

Range: As used herein, the term range may refer to a contiguous range of keys that is covered by the respective slice. For example, the range [a, i) for slice 1-1 in table 610 suggests that slice 1-1 covers key range from a to i (excluding i). The range for a slice is assigned to the slice when the slice is created and may not be change until the slice is dropped (i.e. deleted).

Current state: As used herein, the term current state refers to the current state that the respective slice is associated with. For example, a current state may be one of the following: provisioning, owned, transfer-out-read-only, transfer-out-hand-off, transfer-out-committed, transfer-in, transfer-in-hand-off, unowned and dropped. Each state is associated with a set of permissions such as read permission, write permission, or if a slice is claimed. If a state transition is complete, the current state will be updated to the next state and if a state transition is rejected, the current state may remain unchanged or change to an alternative state. The various states are discussed in further detail in accordance with state management module 532 in FIG. 5.

Next state: As used herein, the term next state refers to the next state that the respective slice is expected to move to. For example, during a slice transfer, the slice may move through a series of states and the field next state indicates the expected state that the slice may move to. A next state may be one of the following: owned, transfer-out-read-only, transfer-out-hand-off, transfer-out-committed, transfer-in, transfer-in-hand-off, unowned and dropped. In one embodiment, for each current state, only a specific set of next states are possible to move to, which means that a slice may only transition to one or more specific next states from the current state. If a state transition is complete, the current state may be updated to the next state and the next state may be updated to null. On the other hand, if a state transition is rejected, the next state may remain the same or may be updated to an alternative state (e.g. null state). The various states and transitions between states are discussed in further detail in accordance with state management module 532 in FIG. 5.

Last registry timestamp: As used herein, the term last registry timestamp is the latest timestamp information retrieved from the slice registry table. A timestamp is the time indicating when a state transition takes place. The timestamp may be in a time format (e.g. date and time), or the timestamp may be a representation reflecting the order when the state transition took place in real time (e.g. 1, 2, 3).

Referring back to FIG. 5, permission checking module 511 determines a set of permissions (e.g. read and write permissions) associated with a slice by ensuring that a slice serves the minimum of permissions granted by current state or next state. Each slice is associated with a current state and a next state, each state associated with a set of permissions. Responsive to receiving a request to access the slice, permission checking module 511 determines a minimum permission based on a first set of permissions associated with the current state and a second set of permissions associated with the next state. This is because, during a state transition, a node keeps record of both the current state and the next state for a slice. The node may not have the most up-to-date knowledge regarding which state the slice is actually in, as the most updated state information is not yet retrieved back from slice registry 530. Therefore, to ensure incoming requests always retrieve accurate results, the slice has the minimum of the permissions granted by either the current state or the next state. Further details regarding slice registry 530 are discussed below.

Slice registry 530 includes a slice registry datastore 520 and FIGS. 7-8 illustrate exemplary particulars of data structures stored in slice registry datastore 520 in further detail. In one embodiment, slice registry datastore 520 stores a centralized slice registry table as illustrated in FIG. 7 and a slice registry log as illustrated in FIG. 8.

FIG. 7 illustrates an example slice registry table 710 that stores centralized metadata for slices stored across nodes. In one embodiment, the fields for slice registry table 710 are as follows:

Slice ID: As used herein, the term Slice Identifier (ID) refers to a unique identifier assigned by the content item management module 308 to identify a particular slice. The slice ID may contain information such as the node that slice is located and a unique slice identifier within the node.

Range: As used herein, the term range may refer to a contiguous range of keys that is covered by the respective slice. For example, the range [a, i) for slice 1-1 in table 710 suggests that slice 1-1 covers key range from a to i (excluding i).

State: As used herein, the term state refers to the state that the respective slice is associated with. For example, a state may be one of the following: provisioning, owned, transfer-out-read-only, transfer-out-hand-off, transfer-out-committed, transfer-in, transfer-in-hand-off, unowned and dropped. Each state is associated with a set of permissions, such as read permission (i.e. if the slice is able to serve read requests), write permission (i.e. if the slice is able to serve write requests), and whether a slice is claimed (i.e. if the slice has the most updated data). The various states are discussed in further detail in accordance with state management module 532 in FIG. 5.

The state information stored in slice registry datastore 520 is the source of truth for state information associated with a slice. This is because slice registry 530 manages state transitions through state management module 532 and makes decisions if a state transition is allowed or rejected. On the other hand, the current state and the next state information stored in the local slice datastore 510 is local information that may not be the most up to date. For example, a slice may not know for sure if the slice is in the current state or the next state as the true state information may not have been transmitted back from slice registry. As a result, the state information maintained in slice registry datastore 520 is the source of truth but could match with either the current state or the next state.

Timestamp: As used herein, the term timestamp is the latest timestamp information for a respective slice. A timestamp is the time at which a state transition takes place. In one embodiment, slice registry 530 may assign a global timestamp to each complete state transition. A timestamp may be in a time format (e.g. date and time), while in another embodiment, the timestamp maybe a representation reflecting the order when the state transition took place in real time (e.g. 1, 2, 3).

Last timestamp: As used herein, the term last timestamp is the latest timestamp information associated with a slice before the latest timestamp (i.e. field "Timestamp").

FIG. 8 illustrates an example slice registry log 720 that stores a list of timestamped slices with corresponding states. The slice registry log 720 is a centralized log recording timestamps and states for slices on different nodes. In one embodiment, slice registry 530 may assign global timestamps to slices across different nodes according to the order in time when the state transitions took place and, therefore, providing a serial view of timestamped state transitions. Maintaining historical timestamps and states for each slice may provide consistent snapshot views for each slice at a certain point in time. For example, if slice registry 530 receives multiple requests from different nodes to read a slice at a certain timestamp, the different requests may always retrieve the same results because of the centralized slice registry log 720. If a slice ID and a timestamp are provided, the slice registry log 720 may always provide a consistent snapshot view of the respective slice at the timestamp, which ensures consistency of data reads.

Returning to the description of FIG. 5, slice creation module 531 creates slices for various operations such as transfer, split and merge of slices. When a slice is created, slice creation module 531 may assign the slice a contiguous range of keys that does not change. In one embodiment, slice creation module 531 may create new slices for slice transfer, split and merge. For example, content item management module 308 may determine that distribution of data among nodes is uneven and decides to transfer a slice from a first node to a second node. In such situation, the slice creation module 531 may need to create a new slice on the second node that covers the same range of keys of the first node. As another example, if content item management module 308 determines that a slice contains data whose size is over a threshold, but the capacity of the node is not as large, content item management module 308 may determine to split the slice into multiple slices. In such situation, the slice creation module 531 may create two or more new slices such that the combined key range of the new slices covers the key range of the original slice. In yet another embodiment, if content item management module 308 determines to merge two slices that are small in size, the slice creation module 531 may create a new slice that covers the combined range of the two small slices. As another example, during a slice transfer from a source slice located on node 1 to a destination slice located on node 2, slice creation module 531 may create a new slice on node 2 and initialize the new slice with a current provisioning state and set the next state to transfer-in, which indicates that the new slice is expected to copy data from the source slice. In another embodiment, slice creation module 531 may create a new slice with new key range of data. In this case, slice creation module 531 may set the current state for the slice to provisioning and set the next state to owned. The different states are further discussed below in accordance with state management module 532.

State management module 532 manages state transitions for slices. In one embodiment, the various states and respective next states are as follows:

Provisioning: as used herein, the term provisioning refers to a state of a slice that is newly created. The provisioning state may only be used in local slice datastore 510 as a slice in provisioning state may not contain any data yet and therefore the slice registry table 520 may not store metadata for a slice that is in a provisioning state. A slice in provisioning state does not have permissions to serve read or write requests and does not have claim for the range of keys that it covers. A slice in provisioning state may transition to following states: owned, transfer-in and unowned.

Owned: as used herein, the term owned refers to a state when a slice has full permissions for the key range of data, including read and write permissions. A slice in owned state has claim of the key range that the slice covers. A slice in owned state may transition to the following state: transfer-out-read-only.

Transfer-out-read-only: as used herein, the term transfer-out-read-only may refer to the state of a source slice when the source slice is in a process of transferring data to a destination slice. When the destination slice has copied a threshold of data (e.g. 90% of data), the source slice may transition to the transfer-out-read-only state, such that the source slice only serves read requests but does not serve write requests. A slice in the transfer-out-read-only state has permission to serve read requests and has claim of the key range of data. A slice may transition from the state transfer-out-read-only to transfer-out-hand-off and owned.

Transfer-out-handoff: as used herein, the term transfer-out-handoff refers to a state of a source slice when the source slice is in a process of transferring data to a destination slice and stops serving read requests. A source slice may transition to the transfer-out-handoff state when the destination slice has copied all the data. A source slice in this state indicates that the two slices are ready for checksum verification to ensure that the copied data matches data on the source slice. A slice in transfer-out-handoff state does not have permissions to serve read or write requests but has claim to the key range of data as the slice still has the most up-to-date data. A slice may transition from transfer-out-handoff state to following states: transfer-out-committed and owned.

Transfer-out-committed: as used herein, the term transfer-out-committed refers to the state of a source slice when the source slice is in a process of transferring data to a destination slice and the source slice no longer has claim to the key range of data. A slice in transfer-out-committed state may not terminate the current operation at this point. A slice in transfer-out-committed state does not have permission to serve read or write requests and does not have claim to the key range of data. A slice in transfer-out-committed state may transition to the following state: unowned.

Transfer-in: as used herein, the term transfer-in refers to the state of a destination slice when a source slice is in a process of transferring data to the destination slice. A slice in transfer-in state does not have permission to serve read or write requests and does not have claim of the key range of data. A slice in transfer-in state may transition to the following states: transfer-in-handoff, unowned.

Transfer-in-handoff: as used herein, the term transfer-in-handoff refers to the state of a destination slice when a source slice is in a process of transferring data to the destination slice and the destination slice has the most updated data copied from the source slice. A slice in state transfer-in-handoff may not serve read or write requests but has claim to the key range of data that it covers. A slice may transition from transfer-in-handoff to the following states: owned and unowned.

Unowned: as used herein, the term unowned refers to a state when a slice that is ready to be deleted. A slice in the state unowned may not serve read or write requests and does not have claim to the key range of data. Unowned is a terminal state in the slice registry datastore 520. A slice may transition to a dropped state but the dropped state may only exist on the local slice datastore 510.

Dropped: as used herein, the term dropped refers to the state when a slice is deleted from the slice registry datastore 520 and therefore the slice registry datastore 520 may not have a slice that is in a dropped state. A slice in the dropped state does not serve read or write requests and does not have claim to the key range of data. A slice does not transition from a dropped state to other states as the slice is expected to be deleted from the node that it locates.

In one embodiment, state management module 532 allows or rejects an action based on a determination whether a state transition is valid. The determination may be based on results outputted from consistency verification system 535. State management module 532 may allow a state transition if consistency verification system 535 determines that invariants still hold after transitioning to next state. On the other hand, state management module 532 may reject any invalid state transitions based on results from the consistency verification system 535 indicating that a transition violates certain invariant checks. The invariant checks are discussed in further detail below in accordance with consistency verification system 535.

Example Process of a Slice Transfer

Figure 9:
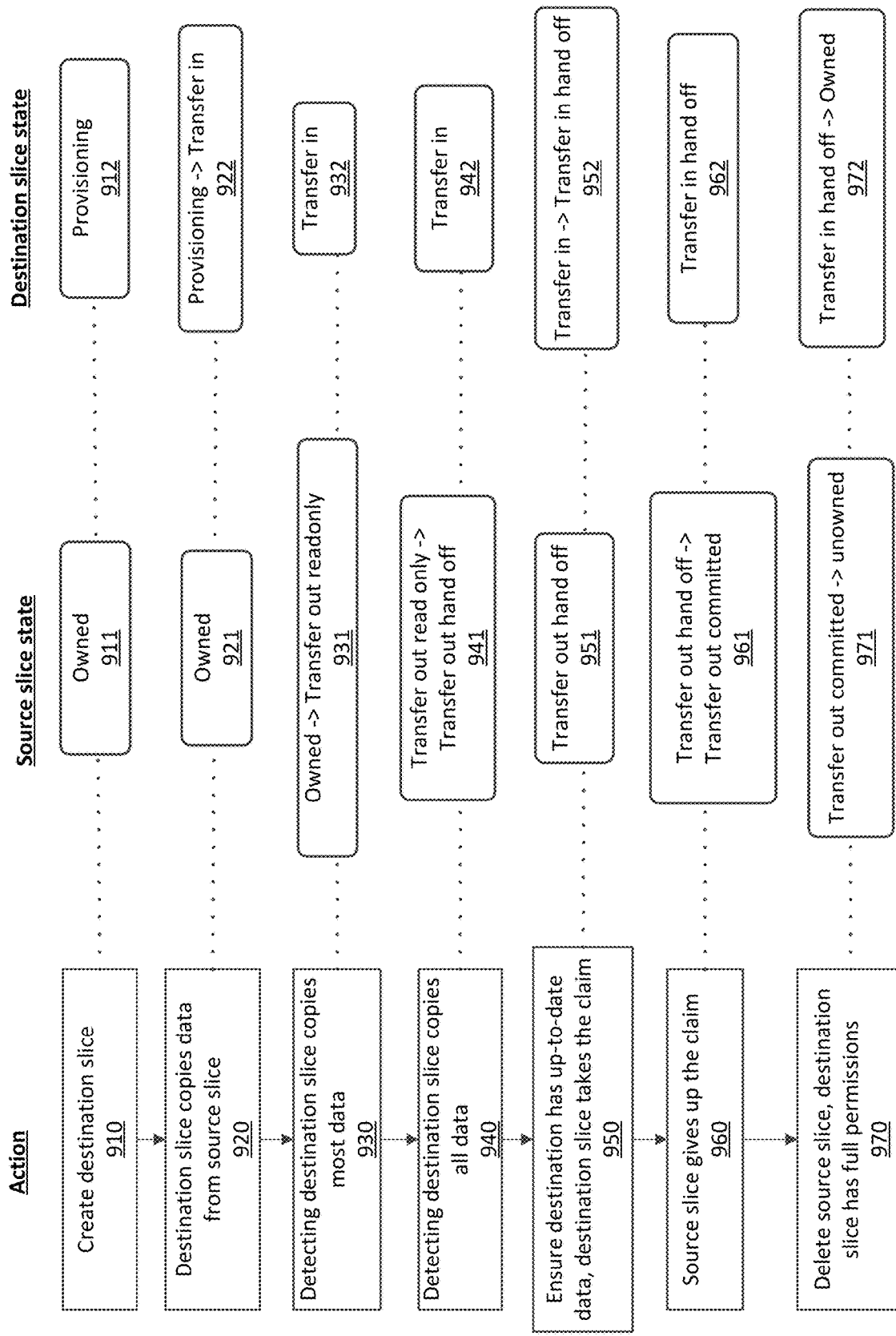
FIG. 9 shows an exemplary process for transferring a source slice to a destination slice and various states that the slices go through, according to one example embodiment.

FIG. 9 illustrates an example process that the content item management module 308 executes to transfer data from a source slice to a destination slice. Furthermore, FIG. 9 also illustrates how each slice moves through its respective state machine.

Slice creation module 531 creates 910 a destination slice covering a contiguous key range on a destination node, with the contiguous key range cover the same key range that the source slice covers. The destination slice may be assigned a provisioning 912 state. The source slice is originally in an owned 911 state that has permissions to serve both read and write requests. When the destination slice starts to copy 920 data from the source slice, the destination slice transitions from provisioning 912 state to transfer-in state 922, while the source slice remains in owned 921 state. Responsive to detecting 930 that the destination slice has copied a threshold amount of data (e.g. a threshold of 90% data), the source slice may transition to transfer-out-read-only 931 state and stops serving write requests so that the destination slice may catch up and finish copying the rest of the data. Responsive to detecting 940 that the destination slice has copied all the data, the source slice transitions to transfer-out-hand-off 941 state and stops serving read requests. The content item management module 308 may verify that the destination slice has an accurate copy of data by checking set sums and responsive to ensuring 950 that the destination has an up-to-date copy of the data, the destination slice transitions to transfer-in-hand-off 952 state, which enables the destination slice to claim the key range of data that it covers. Then, the source slice may give up 960 the claim for the range of data by transitioning to transfer-out-committed 961 state. Finally, the source slice is deleted 970 from the slice registry datastore 520 by transferring to an unowned 971 state and the destination slice has both read and write permissions by transitioning to owned 972 state.

Consistency Verification System

Consistency verification system 535 may verify data accuracy and consistency for data stored in the content item management module 308. Consistency verification system 535 is discussed in further details in accordance with FIGS. 10-12.

Figure 10:
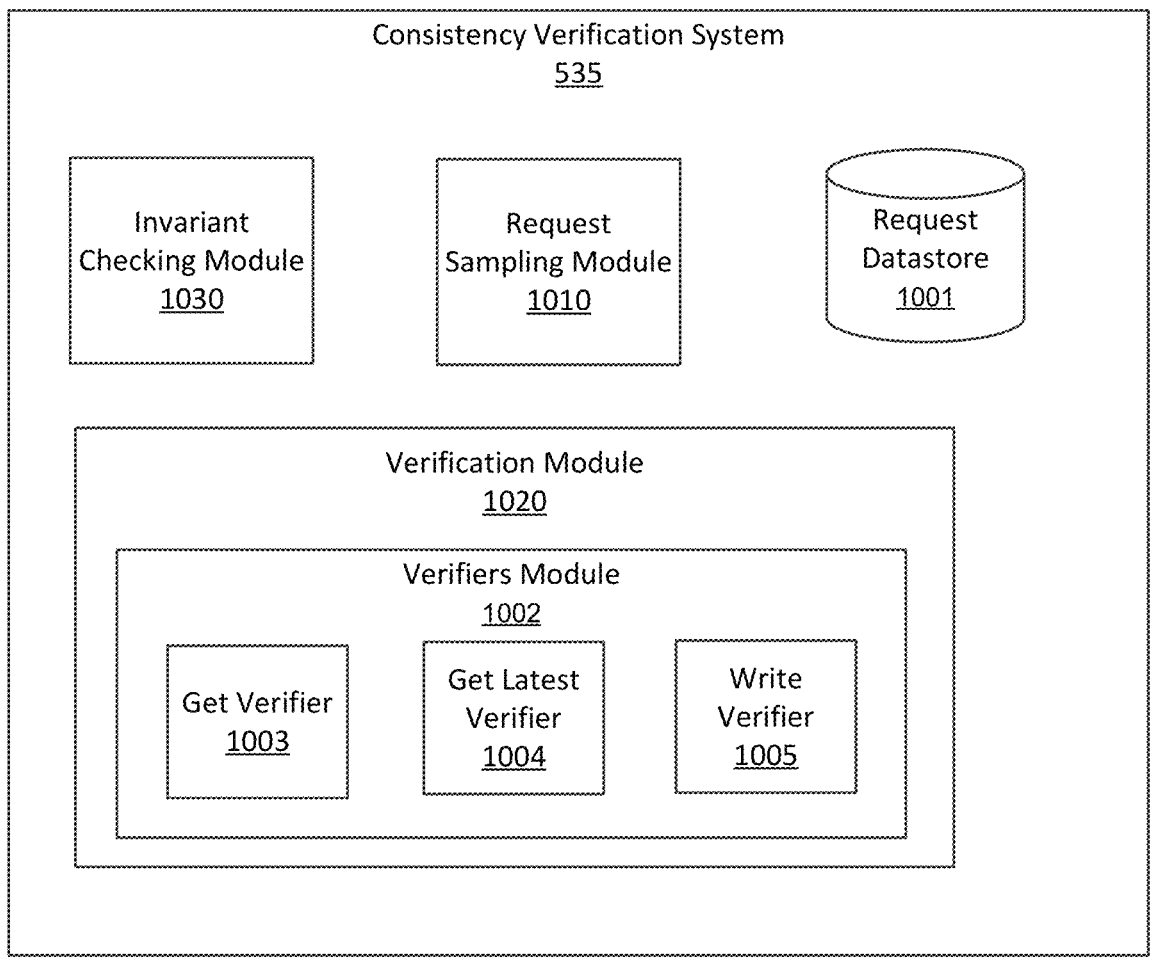
FIG. 10 shows a block diagram of modules in the consistency verification system of the content item management system, according to one example embodiment.

FIG. 10 illustrates an exemplary block diagram of the consistency verification system 535 of the content item management module 308. In the exemplary embodiment illustrated in FIG. 10, consistency verification system 535 includes an invariant checking module 1030 that performs verifications by checking whether certain properties for the database (e.g. invariants) hold for each slice during state transition, a request sampling module 1010 that samples requests from requests sent to the content item management module 308 for verification, a verification module 1020 that selects one or more verifiers for verifying each sampled request, a request datastore 1001 that stores requests sampled by the request sampling module 1010, and a verifiers module 1002 that stores instructions for various verifiers for verifying different types of requests.

Invariant checking module 1030 may perform various invariant checks on the slices and determine validity of invariants by performing various checks on metadata associated with slices. Invariant checking module 1030 may send results of invariants checks to state management module 532. In one embodiment, invariant checking module 1030 performs the following checks on metadata.

State information checks: invariants checking module 1030 may check if the state stored in slice registry datastore 520 matches either the current state or the next state stored in local slice datastore 510. As discussed previously, because the state information stored in slice registry datastore 520 is the true state for a slice, the metadata is valid only if the state stored in slice registry datastore 520 matches either current state or next state in local slice datastore 510.

Timestamp checks: invariants checking module 1030 may also check if the timestamp stored in local slice datastore 510 matches either the timestamp or the last timestamp stored in slice registry datastore 520. Because the timestamp information stored in local slice datastore 520 is retrieved from the slice registry 530, invariants checking module 1030 performs timestamp checks to ensure that the timestamp information stored in local slice datastore 510 is consistent with the latest timestamp information stored in the slice registry 530.

Concurrency checks: invariants checking module 1030 may also ensure that for the same range of keys, at most one slice has either read or write permission. For example, if a first slice that covers key range [a, c] has read or write permission, then invariants checking module 1030 may send instructions to state management module 532 to reject any state transition that grants a second slice read or write permission to the key range [a, c]. In another embodiment, invariants checking module 1030 may allow multiple read permissions to a same range of keys and only reject read/write permissions to a slice with write permission. For example, if a first slice that covers key range [a, c] has read permission, then invariants checking module 1030 may send instructions to state management module 532 to allow a state transition that grants a second slice read permission to the key range [a, c].

Claim check: invariants checking module 1030 may also ensure that for every range of keys, there is at least one slice that has claim of the range of keys, which guarantees that at least one slice has the most updated data for the range of keys. During an operation such as a slice transfer, invariants checking module 1030 may perform the claim check to ensure that there is always at least one slice that has claim for every range of keys.

Slice registry check: The invariants checking module may also ensure that the slice registry datastore 520 maintains an entry for each slice not in provisioning or dropped state. As the states provisioning and dropped may only exist locally on local slice datastore 510, the slice registry datastore 520 may maintain an entry for slices not in the state provisioning or dropped. The slice registry check ensures that slice registry 530 monitors state transitions and state information for every slice.

Continuing with the discussion in FIG. 10, request sampling module 1010 may sample requests from requests previously processed by the content item management module 308 for verification. In one embodiment, request sampling module 1010 samples requests and logs the sampled requests to request datastore 1001. Request sampling module 1010 may randomly samples request, or alternatively, may sample a specific type of request if a particular type of requests is to be verified. Request sampling module 1010 may save, in the request datastore 1001, information associated with each request, such as a key, a parameter timestamp included in the request that specifies a version of data to access, a request timestamp that specifies when the request was originally requested, a response received for the request, and other types of request information. In one embodiment, request sampling module 1010 may further record information such as pre-conditions associated with the request. A pre-condition may be one or more requirements that the database needed to meet at the time when the request was requested. For example, suppose the original request was requested at time T1 and a precondition may specify one or more restrictions for the database at a time before T1, such as T0.

Verification module 1020 may consume sampled requests stored in the request datastore 1001 and perform verification of the requests by replaying the sampled requests. In one embodiment, verification module 1020 may consume requests from the datastore and issue verification requests to content item management module 308 with various holdoff periods. For each sampled request to verify, verification module 1020 may determine and select one or more verifiers from the verifiers module 1002 based, for example, on a type of the request. Following are some examples of verifiers included in the verifiers module 1002. The verifiers discussed below are for illustration purposes only and more verifiers with additional functionalities may be included.

A "get verifier" 1003 may verify a read request. A read request to be verified may be referred to as an original request. The get verifier 1003 may verify the original request by replaying the original request with a same set of parameters associated with the original request, and the replayed request may be referred to as a verification request. For example, the original request may request to access data with a key K1 at timestamp T1. The timestamp T1 may refer to a version of the data to access. The original request may be applied at another timestamp that is after T1. For example, the original request was issued to the content item management system at T2 to read data at T1. The original request may receive a response R1. To verify the read request, the get verifier 1003 may issue a verification request to content item management module 308 with the verification request being a read request with the parameters key K1 and timestamp T1. If the verification request receives a same response R1, the verification module 1020 may determine that no issues are found during the verification process. On the other hand, if the response is different from R1, verification module 1020 may determine that data inconsistency is detected in the database and output the results to content item management module 308.

In one embodiment, the get verifier 1003 may verify data consistency for a range of keys. For example, the original read request may read data for a range of keys such as K1-K9, and the original response may be R1-R9. The get verifier 1003 may issue a verification read request to the content item management module 308 to read data for the range of keys K1-K9 and verify the results by comparing the returned results with R1-R9.

A "get latest verifier" 1004 may verify the latest timestamp associated with data corresponding to a key specified in the original request. In one embodiment, an original request may specify a key and receive a timestamp that indicates the latest timestamp associated with the latest operation for respective data, such as state change or write operation performed on the data. The get latest verifier 1004 may be used as a checking step in a write verifier.

A "write verifier" 1005 may verify a write request. The write verifier 1005 may verify a previous write request issued to the content item management module 308. In one embodiment, an original write request may include a set of parameters including a set of preconditions, a key, and data to write (or insert, modify, delete, etc.). The original write request may be committed at a commit timestamp T1. In one embodiment, the commit timestamp T1 is assigned to the write request only when the preconditions are met. The set of preconditions may specify one or more conditions to meet before executing the write operation, and if the preconditions are not met, the write operation may not be executed. The write verifier 1005 may verify the original requests by issuing one or more verification requests. For example, the write verifier 1005 may issue one or more read requests to check whether preconditions were met, one or more read requests to check whether the write operation was applied successfully, and a get latest verifier 1004 to check whether the write operation causes timestamps to move forward and data associated with pervious timestamps are not affected. To illustrate with a concrete example, suppose an original write request was to apply a write operation to key K1, and write data K1="peanut butter" at commit timestamp T1. A precondition for the request was that the data should be K1="peanut" at T0, where T0 is a time before T1. In one embodiment, the preconditions may be required in any situation when the write operation should only be performed if the latest data needs to meet a predetermined requirement (e.g. only write if the data is updated to a specific version). The write verifier 1005 may issue a verification read request to content item management module 308 to verify that at T0, the data for key K1 is R0. After checking the precondition, the write verifier 1005 may issue another verification read request to verify that at T1 the data for K1 is "peanut butter." The write verifier 1005 may issue a get latest verifier 1004 to verify that the latest timestamp for key K1 is a timestamp that is T1 or a timestamp after T1, which helps ensure that the write operation moves forward the timestamps.

Verifiers module 1002 may further include verifiers for verifying other types of requests. For example, a "history verifier" may verify a history request that requests to retrieve historical data for a given key. The history verifier may send a verification request to content item management module 308 to retrieve historical data, compare with the original response received for the original history request, and verify if the verification response is consistent with the original response. Similarly, a version history verifier may verify a version history request that requests to retrieve a history of versions (e.g. timestamps) for a give key.

Verification module 1020 may also control timing when the requests are to be replayed. The request may be replayed after the original request time with a holdoff period. In one embodiment, multiple verification requests with multiple holdoff periods may be performed for verifying a request. For example, a request may be replayed after 1 min, 5 mins, and 10 mins. In one embodiment the holdoff period is determined by a user, for example, a system administrator, in another embodiment, the holdoff period is determined by the system based on the amount of traffic of requests to the content item management module 308.

In one embodiment, verification module 1020 may attach tags to verification requests. A tag may indicate that the request is a verification request that is distinguishable from a normal request. Requests that are marked as verification requests are not sampled and no more verification request/process is performed on the verification requests.

Figure 11:
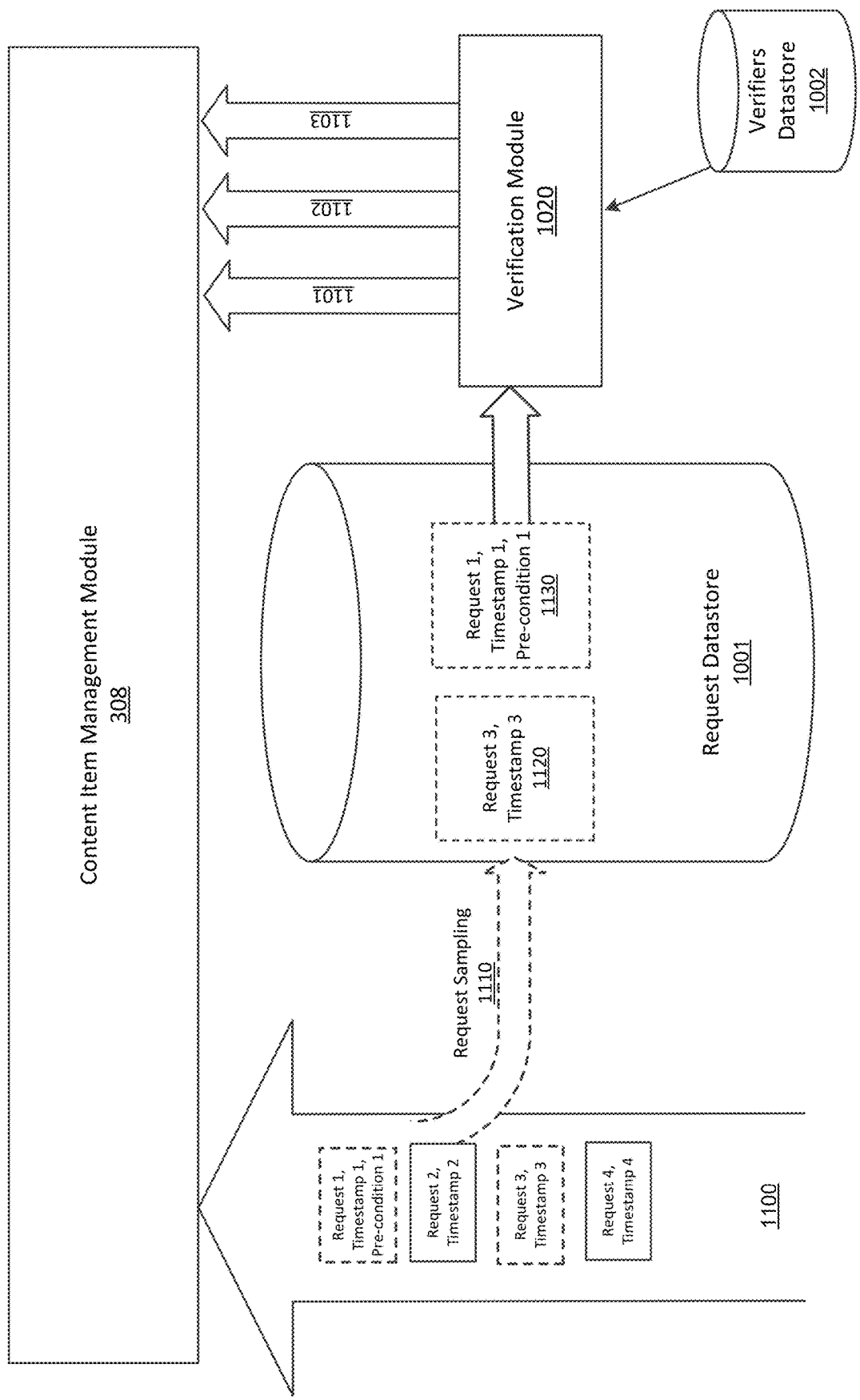
FIG. 11 illustrates an exemplary verification process performed by the consistency verification system, according to one example embodiment.

FIG. 11 illustrates an exemplary verification process performed by the consistency verification system 535, according to one embodiment. In FIG. 11, requests 1100 may include requests (e.g. requests 1-4) sent from clients 120 to content item management module 308 for processing. The requests 1100 may be referred to as original requests. In one embodiment, the original requests 1100 have been processed by the content item management module 308 and each of the request 1100 may be associated with a response received from the content item management module 308. The request sampling module 1010 may perform a request sampling process 1110 to sample requests for verification and store the sampled requests in request datastore 1001. Request sampling module 1010 may sample requests based on a probability that each request may be selected. In the embodiment illustrated in FIG. 11, request 1130 (i.e. request 1) and request 1120 (i.e. request 2) are sampled and information related to the sampled requests are stored in the request datastore 1001. For example, as illustrated in request 1130, request 1 may include parameters such as a key, or a key range, and request 1 may be requested at timestamp T1. The request may be a write request associated with a pre-condition 1, where the precondition may specify that at time T0, the value for the key K1 is R0, and if the value for key K1 at T0 is not R0, the write request should not be processed. Request 3 may be a read request that was requested at time T3 and the request may be also associated with a key K3 and a response R3. The verification module 1020 may consume and verify the sampled requests stored in 1001 by selecting a verifier from the verifiers module 1002. The verifier may be selected based on type of the original request to verify. For example, if the original request is a read request, the verifier selected may be a read verifier; if the original request is a get latest request, the verifier selected may be a get latest request, and if the original request is a write request, the verifier selected may be a write verifier.

In one embodiment, each verifier may include a set of instructions that indicate one or more properties associated with the request to verify. To verify the one or more properties, the verification module 1020 may send one or more verification requests to content item management module 308. For example, to verify a write request, the verification module 1020 may select a write verifier that includes instructions to verify precondition, operation and latest timestamp associated with the write request. To verify the precondition, verification module 1020 may send a verification read request; to verify whether the write operation is successful, verification module 1020 may send a second verification read request to read data at a commit timestamp when the write operation was committed. To verify that the write operation advanced the timestamp, verification module 1020 may use a get latest verifier to send a get latest timestamp request to content item management module 308, and verify that the latest timestamp is after or equal to the commit timestamp.

In one embodiment, the verification module 1020 may control holdoff periods such that each request is replayed with multiple different holdoff periods (such as 10 seconds, 1 minute and 10 minutes). The verification module 1020 may control when each instance of each verification request may be performed. For example, requests 1101-1103 may be three verification requests with different holdoff periods for replaying request 1 (e.g. request 1101 may be verification request with holdoff period of 10 seconds, request 1102 may have a holdoff period of 1 minute, and request 1103 may have a holdoff period of 100 minutes). In one embodiment, the verification module 1020 may interweave the verification requests for different original requests based on holdoff periods. For example, verification request 1101 may be request 1 with 10 seconds holdoff period, verification request 1102 may be request 3 with 10 seconds holdoff period, and verification request 1103 may be request 1 with 1 min holdoff period. In one embodiment, the verification requests 1101-1104 are tagged with a verification tag such that the verification requests are not sampled again by the sampling process 1110.

Figure 12:
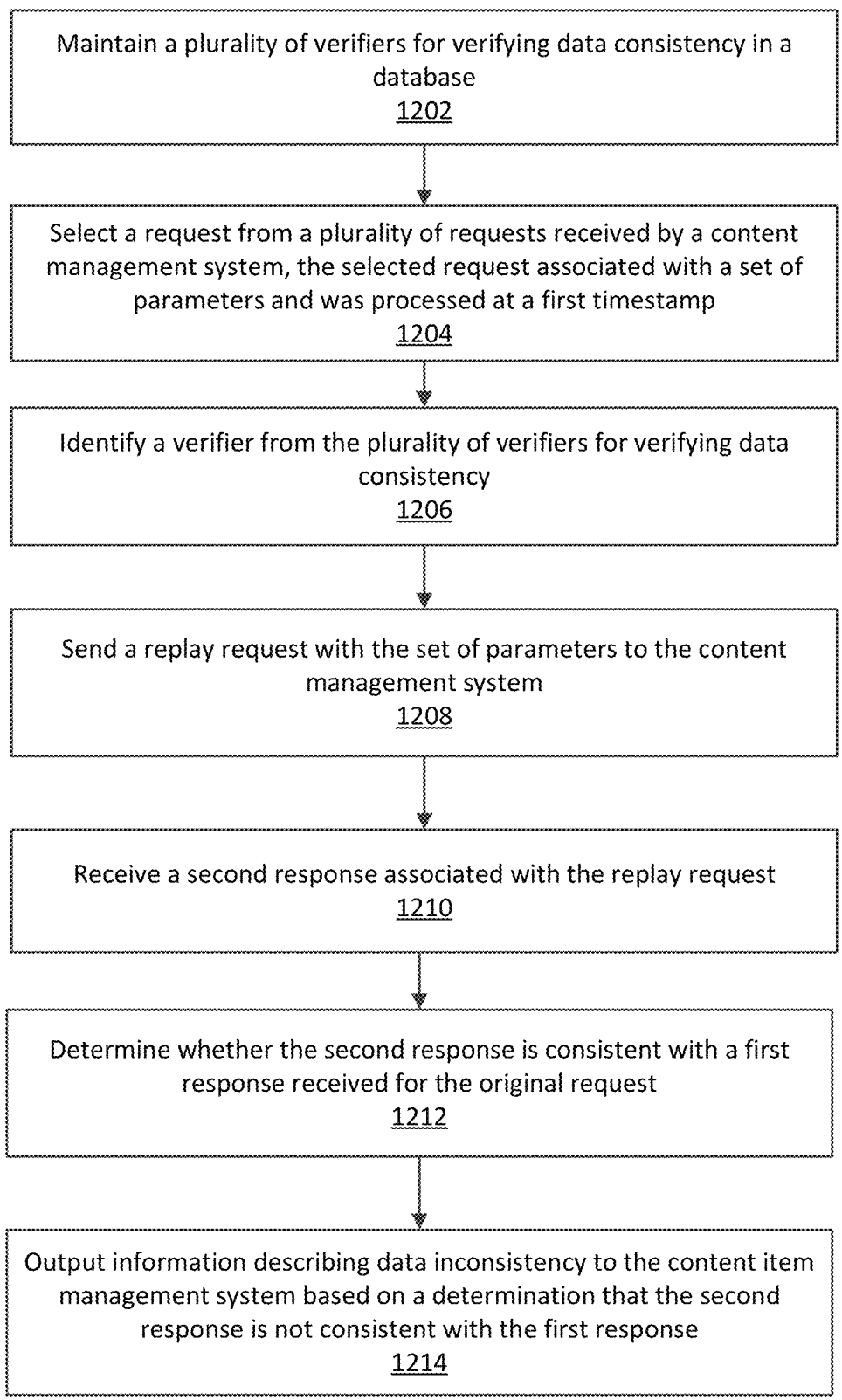
FIG. 12 illustrates an exemplary process for verifying a previously performed request, according to one example embodiment.

FIG. 12 illustrates an exemplary verification process. The process may start with the consistency verification system 535 maintaining 1202 a plurality of verifiers in the verifiers module 1002 for verifying data consistency, where each verifier comprises a set of instructions for verifying data consistency for type of requests. The content item management module 308 may receive a plurality of requests and perform operations such as read or write operations in response to each request. The request sampling module 1010 may select 1204 a request from the plurality of requests. The selected request may be processed at a first timestamp and is associated with a first response. The selected request may further associate with a set of parameters. The verification module 1020 may identify 1206 a verifier from the plurality of verifiers and verify data consistency using the verifier. The verification module 1020 may send 1208 a replay request with the set of parameters specified in the original request to the content item management module 308 and receive 1210 a second response for the replay request. The verification module 1020 may determine whether the second response is consistent with the first response received for the original request. Based on a determination that the second response is not consistent with the first response, the verification module 1020 may output information describing data inconsistency to the content item management system.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for checking data consistency in a distributed key-value pair database, the method comprising:
    maintaining a plurality of verifiers for verifying data consistency in the database, wherein each verifier comprises a set of instructions for verifying data consistency for a type of request;

processing, by a content item management system, a plurality of requests, wherein processing each request comprises performing, by the content item management system one or more operations;
selecting a request from the processed plurality of requests, wherein the selected request was processed at a first timestamp, received a first response, and specified a set of one or more parameters;
identifying a verifier from the plurality of verifiers to verify data consistency associated with the selected request; and
verifying, by the identified verifier, data consistency associated with the selected request, the verification comprising:
  sending a replay request corresponding to the selected request, the replay request including the set of parameters, wherein the replay request is sent at a second timestamp after the first timestamp, the first timestamp and the second timestamp separated by a predefined holdoff period;
  receiving a second response associated with the replay request;
  determining whether the second response is consistent with the first response; and
  based on a determination that the second response is not consistent with the first response, outputting information describing data inconsistency.

2. The method of claim 1, wherein the selected verifier is a write verifier, and the selected request is a write request associated with a precondition, wherein the write request commits a write operation at the first timestamp.

3. The method of claim 2, wherein the verification further comprises:
  verifying the precondition associated with the write request; and
  verifying a latest timestamp associated with the write request by checking whether the latest timestamp is greater than or equal to the first timestamp.

4. The method of claim 3, wherein verifying the precondition comprises:
  sending a read request, the read request specifying a read operation associated with a timestamp before the first timestamp;
  receiving a response; and
  determining whether the response is consistent with the precondition.

5. The method of claim 1, wherein the set of parameters comprise a key and a timestamp.

6. The method of claim 1, wherein the set of parameters comprise a range of keys.

7. The method of claim 1, further comprising:
  checking whether a plurality of invariants associated with the database satisfy a set of rules during a state transition process; and
  responsive to at least one invariant of the plurality of invariants failing to satisfy a rule of the set of rules during the state transition process, sending information describing the failure.

8. A non-transitory computer-readable storage medium storing executable computer instructions that, when executed by one or more processors, cause the one or more processors to perform steps comprising:
  maintaining a plurality of verifiers for verifying data consistency in a database, wherein each verifier comprises a set of instructions for verifying data consistency for a type of requests;
  receiving, by a content item management system, a plurality of requests, wherein the content item management system performs operations in response to each request;
  selecting a request from the plurality of requests, wherein the selected request was processed at a first timestamp and is associated with a first response, the request specifying a set of parameters;
  identifying a verifier from the plurality of verifiers to verify data consistency of the data processed in response to the selected request; and
  verifying, by the identified verifier, data consistency of the data processed in response to the selected request, the verification comprising:
    sending a replay request corresponding to the selected request, the replay request including the set of parameters, wherein the replay request is sent at a second timestamp after the first timestamp, the first timestamp and the second timestamp separated by a predefined holdoff period;
    receiving a second response associated with the replay request;
    determining, based on the first and the second response, whether to output information describing data inconsistency to the content item management system.

9. The non-transitory computer-readable storage medium of claim 8, wherein the selected verifier is a write verifier that is selected based on a type associated with the request, and the selected request is a write request associated with a precondition, wherein the write request commits a write operation at the first timestamp.

10. The non-transitory computer-readable storage medium of claim 9, wherein the verification further comprises:
  verifying the precondition associated with the write request; and
  verifying a latest timestamp associated with the write request by checking whether the latest timestamp is greater than or equal to the first timestamp.

11. The non-transitory computer-readable storage medium of claim 10, wherein verifying the precondition comprises:
  sending a read request, the read request specifying a read operation associated with a timestamp before the first timestamp;
  receiving a response; and
  determining whether the response is consistent with the precondition.

12. The non-transitory computer-readable storage medium of claim 8, wherein the steps further comprising:
  checking whether a plurality of invariants associated with the database satisfy a set of rules during a state transition process; and
  responsive to at least one invariant of the plurality of invariants failing to satisfy a rule of the set of rules during the state transition process, sending information describing the failure.

13. A system comprising:
one or more processors configured to execute instructions; and
a memory storing instructions for execution on the one or more processors, including instructions causing the one or more processors to:
  maintain a plurality of verifiers for verifying data consistency in a database, wherein each verifier comprises a set of instructions for verifying data consistency for a type of requests;

receive, by a content item management system, a plurality of requests, wherein the content item management system performs operations in response to each request;

select a request from the plurality of requests, wherein the selected request was processed at a first timestamp and is associated with a first response, the request specifying a set of parameters;

identify a verifier from the plurality of verifiers, based on a type of the request, to verify data consistency of data processed in response to the selected request; and verify, by the identified verifier, data consistency of the data processed in response to the selected request, wherein the verification comprises sending a second request and receiving a second response, wherein the second request is sent at a second timestamp after the first timestamp, the first timestamp and the second timestamp separated by a predefined holdoff period; and determine, based on the first response and the second response, whether to output information describing data inconsistency.

14. The system of claim 13, wherein the selected verifier is a write verifier, and the selected request is a write request associated with a precondition, wherein the write request commits a write operation at the first timestamp.

15. The system of claim 14, wherein the verification further comprises:
    verifying the precondition associated with the write request; and
    verifying a latest timestamp associated with the write request by checking whether the latest timestamp is greater than or equal to the first timestamp.

16. The system of claim 15, wherein verifying the precondition comprises:
    sending a read request with the set of parameters, the read request specifying a read operation associated with a timestamp before the first timestamp;
    receiving a response; and
    determining whether the response is consistent with the precondition.

17. The system of claim 13, wherein the instructions further cause the one or more processors to:
    check whether a plurality of invariants associated with the database satisfy a set of rules during a state transition process; and
    responsive to at least one invariant of the plurality of invariants failing to satisfy a rule of the set of rules during the state transition process, send information describing the failure.

* * * * *